United States Patent

[11] 3,608,682

[72] Inventors John R. Newton
Strongsville;
Carl B. Salzinger, Mayfield Heights, both of Ohio
[21] Appl. No. 664,134
[22] Filed Aug. 29, 1967
[45] Patented Sept. 28, 1971
[73] Assignee The Dow Chemical Company
Midland, Mich.

[54] LUGGAGE CONSTRUCTION
12 Claims, 3 Drawing Figs.
[52] U.S. Cl. .................................................. 190/53,
161/6, 161/165, 161/253
[51] Int. Cl. ..................................................... A45c 5/02,
B32b 27/32
[50] Field of Search ........................................ 161/6, 165,
247–248, 253, 402, 413; 190/23, 40, 53 P

[56] References Cited
UNITED STATES PATENTS
3,473,996 10/1969 Whalen ......................... 161/6
3,462,329 8/1969 Beyer ........................... 161/413 X
3,475,248 10/1969 Brasure ......................... 161/6 X
3,508,944 4/1970 Henderson et al. ............ 161/402 X
3,515,616 6/1970 Miyamoto et al. ............. 161/248 X
2,714,559 8/1955 Sheffield et al. ............... 161/5
2,812,277 11/1957 Hemming et al. .............. 161/165
3,309,257 3/1967 Borack .......................... 161/6

Primary Examiner—Harold Ansher
Attorneys—Griswold and Burdick, Richard G. Waterman and Lloyd E. Hessenaur, Jr.

ABSTRACT: This invention concerns a suitcase or the like having a nonblushable outer skin comprising laminated plies of plastic, blushing being the tendency of many plastics of suitable thickness for skin employment to fade or whiten as, for example, when bent around corners and edges in the fitting and securing of the skin to the suitcase frame. Preferably the skin is of a three-ply construction with each ply being in its naturally transparent or translucent nonpigmented state. A pigmented, opaque adhesive blended to provide the desired skin color secures the two outermost plies. The outer ply is formed sufficiently thin to endure the bending or forming required, such as at the corners of the suitcase, without the occurrence of a blush mark thereat. Thus, the combination of the opaque adhesive and thin outer ply effectively conceals and prevents blush marks from appearing on the visible outer surfaces of the skin.

PATENTED SEP 28 1971  3,608,682
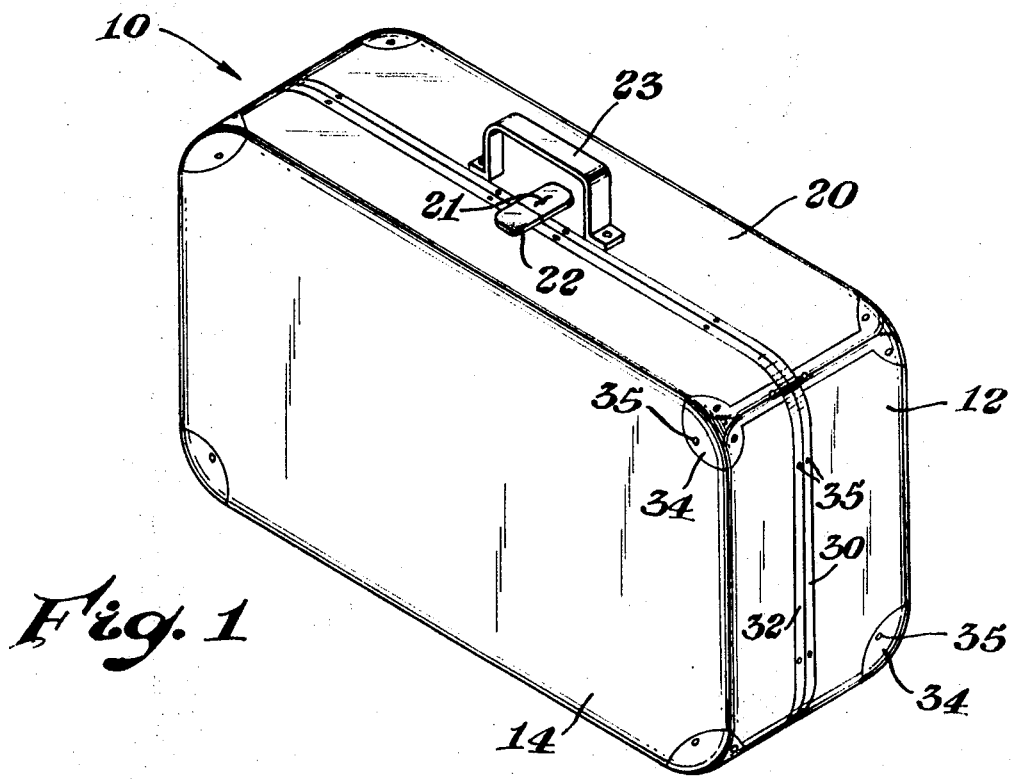
Fig. 1
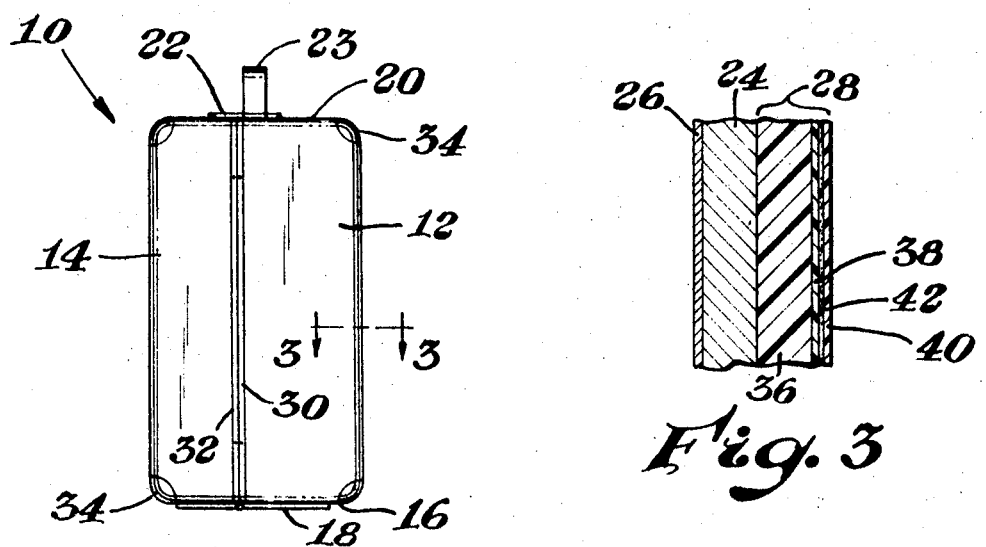
Fig. 2
Fig. 3
INVENTOR.
John R. Newton
BY Carl B. Salzinger
Griswold & Burdick
ATTORNEYS

LUGGAGE CONSTRUCTION

DESCRIPTION OF INVENTION

Prior to the present discovery, many plastics were often unsatisfactory for employment as outer skins on suitcases because of their tendency to whiten or fade at corners and edge portions due to the necessary bending of the skin at these points to fit the frame. Whitening or fading due to flexing or denting i.e., stress-whitening of the skin upon impacts incurred during normal handling and shipping of suitcases is also a problem. This phenomena is generally referred to as blushing or forming of a blush or stress-whitening mark. The degree of intensity of blushing appears to be somewhat correlated to thickness, such that the plastic sheets of sufficient thickness for suitcase outer skins are often more severely affected. Of course, some plastic compositions, like polypropylene, by nature blush more easily than others. However, polypropylene and other similar easily blushable plastic compositions frequently possess the tough, scuff-resistant qualities highly desired for suitcase construction.

Accordingly, it is an object of the present invention to provide a plastic outer skin for suitcases and the like, wherein the skin can comprise blushable plastic compositions, and yet wherein the skin is so constructed as to be substantially nonblushable at the outer visible surfaces thereof.

Another object of the present invention is to provide a plastic outer skin for suitcases and the like, wherein skin color changes can be effected with a minimum of expense and effort, and wherein the skin construction most satisfactorily lends itself to the techniques of mass production on a highly economical basis.

A further object of the present invention is to provide a plastic outer skin for suitcases and the like, wherein a wide spectrum of skin colors, color shades, and degrees of opacity are possible.

Yet another object of the present invention is to provide a plastic outer skin for suitcases and the like, constructed of laminated plies of plastic secured so as to endure a maximum of abuse without delaminating.

Briefly then, this invention comprises a suitcase or like article employing a nonblushable outer skin constructed of laminated plies of plastic. Preferably the skin includes three plies with each ply being in its naturally transparent or translucent nonpigmented state. An opaque, pigmented adhesive secures the two outermost plies as well as provides the desired skin color. Preferably the adhesive employed is of the thermosetting family selected for its bonding strength to the particular plastic compositions forming the plies to be secured. The outer ply is formed sufficiently thin to endure the maximum bend expected, such as at suitcase corners, without forming a blush mark. Together with the opaque adhesive then, the outer ply effectively conceals and prevents blush marks from appearing on the outer visible surfaces of the skin. Preferably the two innermost plies are secured by heat-sealing when sufficiently compatible. Fabrication of a three-ply skin is most advantageously accomplished by initially adhering the outer and intermediate plies. This two-ply laminate is then bonded directly to the inner ply as it is extruded, the heat of extrusion being largely sufficient to weld the plies together. In this fashion, color changes can be effected by merely switching the particular colored roll being fed to the extruded inner ply for bonding.

Yet additional objects and advantages of the present invention, and its numerous cognate benefits and features are even more apparent and manifest in and by the ensuing description taken in conjunction with the accompanying drawing in which, where possible, like reference characters designate corresponding materials and parts throughout the several views thereof in which:

FIG. 1 is an isometric view of a closed suitcase constructed according to the principles of the present invention;

FIG. 2 is an end view thereof; and

FIG. 3 is an enlarged fragmentary cross-sectional view taken through line 3—3 of FIG. 2.

Referring now more particularly to the drawings, there is shown a suitcase of piece of luggage 10 arranged in an upright position. Suitcase 10 includes a mating container portion 12 and a lid portion 14, the container portion 12 and lid portion 14 being hingedly affixed at the bottom end 16 of suitcase 10 by a hinge 18. A lock 22 is located at the top end 20 of suitcase 10 and securely fastens the container portion 12 to the lid portion 14. The lock 20 can include a keyhole 21 cut therein to provide access to actuate a suitable locking and release mechanism selected from those available and well known to the art. Mounted on the container portion at the top end 20 is a handle 23.

The construction of the container portion 12 and similarly the lid portion 14, comprises a frame 24 sandwiched between an inner liner 26 of preferably fabric material, and an outer skin or covering 28 of laminated plies of plastic, as is best illustrated in FIG. 3. Frame 24 can accurately be described as including two halves, one half comprising and formed to the general contour desired of the container portion 12, and the other half, then comprising and formed to the general contour desired of the lid portion 14. Preferably, the respective halves of frame 24 are pressure formed to desired shape from a lightweight easily worked sheet metal, aluminum and magnesium being examples thereof.

Frames, like frame 24, are well known in the art and are used quite extensively to provide what is often referred to as a stiff or hard-walled suitcase. Proper frame selection in regard to design and strength, especially in guarding against denting, collapse or generally deformation in the course of normal suitcase handling and use, hinges substantially on the level of suitcase quality desired and is well within the capability of those skilled in the art. Of course, present day suitcase manufactures are usually already well settled as to preferred frame strength tolerances, designs and constructions which, it may be added, vary considerably throughout the industry in quality and degree of sophistication. For instance, some manufactures employ a more abbreviated frame than that shown comparable perhaps in principle to the supporting frame of a canvas awning wherein the suitcase frame comprises merely a framework or structure of strategically placed members over which the outer skin or covering can be stretched. A common example of this would include a pair of peripherally extending rectangular members respectively corresponding to the lid and container portion halves of frame 24, and each generally similar in design to a dresser drawer wherein the bottom portion thereof has been removed. Further similarity to a dresser drawer, this time with the bottom portion intact, would include each frame member with the outer skin or covering stretched over and affixed thereto, the outer skin, of course, simulating the bottom portion of the drawer. These frames are frequently constructed of wood or materials other than metal and provide what is commonly referred to as a soft-walled or soft-sides suitcase.

Thus, while the present invention is described in particularity with reference to a hard-wall suitcase and a suitable frame therefore, it should be readily apparent that a considerable diversity of the suitcase frame designs and constructions are presently available and can be employed to practice the principles of the present invention with only minimal modifications thereof where applicable. Certainly, in view of the disclosure of invention herein, such modifications where needed would be well within the powers of those skilled in suitcase construction.

An inner lining 26 is a common expediency in suitcases for providing a soft pleasing interior to contact articles of clothing placed therewithin. Nylon, or other synthetic fabrics as well as natural cloths, such as cotton, can comprise the inner lining 26. Of course, many other suitable lining materials or laminated combination of materials are well known in suitcase construction and can advantageously be employed for use here also.

The thereto, skin or covering 28 is preferably a three-ply construction including an inner ply or substrate portion 36, an intermediate ply 38 highly compatible with inner ply 36 and heat sealed thereto, and an outer ply 40 secured to the intermediate ply 38 by a suitable opaque, pigmented adhesive 42.

Inner ply 36 is formed substantially thicker than the intermediate ply 38 and outer ply 40. In this preferred arrangement the inner ply 36 provides the principle portion of the body and toughness desired of skin 28. Since the inner ply 36 is concealed from view at the outer surfaces of skin 28 by the opaque adhesive 42, an easily blushable plastic composition, like a polypropylene composition, can form this ply. Where polypropylene comprises the inner ply 36, and for a hard-wall suitcase, like suitcase 10, thicknesses in the range of from about 10 mils to about 60 mils are usually sufficient. The exact thickness chosen depends greatly on factors such as the size and configuration of the suitcase, frame design, and general suitcase quality desired, the thicknesses and number of other plies employed, and the physical properties of the particular polypropylene composition itself. The selected thickness of ply 36, of course, can reside outside the usually preferred range, as, for example, a thickness in excess of 60 mils conceivably would be desirable for an especially high quality, abuse-resistant suitcase of relatively large dimensions. Conversely, for a small, low-cost, low-quality suitcase an inner ply 36 of less than 10 mils could be satisfactory.

It should be noted that the applicable inner ply thicknesses discussed above are particularly directed to hard-side suitcase constructions. For a soft-side suitcase employing a more abbreviated frame than that of suitcase 10, a somewhat greater outer skin thickness range, or if you prefer, inner ply thickness range as regards the preferred skin construction, might be desired to impute extra body as well as shape-holding qualities to the portions thereof not directly backed by a frame structure. Alternately, however, it is customary in present day suitcase fabrication to add suitable reinforcing materials at these nonframe-backed areas, as, for example, stiff paper, to obtain the structural qualities desired at these points.

Other plastic compositions having stiffness and toughness qualities like polypropylene, such as polyethylene, can form inner ply 36. As with polypropylene, the desired or optimum thickness of these plastics can vary considerably and will depend to a large extent on the above-enumerated factors. Most generally, however, close conformity with the thicknesses applicable for polypropylene can be expected.

The intermediate ply 38 greatly facilitates fabrication of the raw skin laminate material, as is discussed more fully hereinafter, and is selected from plastic compositions sufficiently compatible with inner ply 36 so that a heat-seal of desired bond strength can be effected therebetween. With a polypropylene inner ply 36, polypropylene also preferably comprises the intermediate ply 38, as compatibility between polypropylene and other plastic compositions has been found generally unsatisfactory. For polypropylene then, a sufficient thickness will generally be within the range of from about ½ mil to about 1¼ mils. In this thickness range, blushing of polyproplylene at the usual angles of bend encountered in general suitcase construction is minimal if noticeable at all. Even so, since the opaque adhesive 42 also conceals the intermediate ply 38 from view at the outer surfaces of the suitcase, blushing would not be a problem. Accordingly it should be readily apparent that thicknesses substantially in excess of 1¼ mils wherein considerable blushing would occur, and wherein the ply could supply considerable body to the laminate structure, can be employed. For heat-aealing to an extruding inner ply 36, however, the thinner intermediate plies 38 are preferred. Thicknesses substantially less than ½ mil conceivably are also applicable. Here, however, care must be exercised to insure a sufficient mass of film material to satisfactorily effect the heat-seal to the inner ply 36 and to effect the desired adhesive bond with the outer ply 40.

The outer ply 40 can comprise any of a impacts array of films having qualities suitable to adequately resist abrasion and scuffing during the normal handling and abuse conditions incurred by the suitcase. A biaxially orientated polypropylene has been found especially suitable and somewhat tougher than a nonorientated or mono-axially orientated polypropylene. The maximum allowable thickness of the outer ply 40 approaches that at which the ply would incur noticeable blushing at the severest angles of bend required of the skin during assembly thereof on the suitcase. Tolerances as to maximum thickness should also be calculated to include nonblushable qualities at the severest skin flexures expected from impacts occurring in the normal employment of the finished suitcase or similar article. Conversely, the minimum thickness of outer ply 40 approaches that at which scuff and abrasive resistance as well as bonding is unsatisfactorily impaired. For biaxially orientated polypropylene, a thickness of between about ½ mil to about 1¼ mils has been found to be sufficiently within the minimum and maximum tolerances for ordinary suitcase construction.

Other plastic compositions having toughness and scuff-resistant qualities like polypropylene, as, for example, polyethylene, nylon, or Mylar®, and which are available at thicknesses that resist blushing at the severity of bend required can, of course, equally advantageously form outer ply 40.

The adhesive 42 is carefully selected to provide a high-strength bond between the 2 ply 40 and intermediate ply 38. Of course, the composition of the plies to be secured is often critical to the choice of adhesive employed. An especially suitable adhesive for the securing of two polypropylene plies was found to be a thermosetting adhesive sold under the designation 46960 by the E. I. du Pont de Nemours Corporation. The 46960 thermoset adhesive comprised 80 percent by weight of the total composition. To this was added a catalyst also sold by the E. I. du Pont de Nemours Corporation and designated as RC 829 and measuring 4½ percent of composition weight. Essentially the catalyst aids polymerization of the adhesive setting the bond between the two plies. The remainder or 19½ percent of the weight of the composition comprised suitable pigments blended to obtain an opaque blue skin coloring. The pigments included 13percent by weight of Penn color 34 @ 156 (white) sold by the Sun Oil Company, 2percent by weight of 217 E293 (black), and 4½ percent by weight of 217 E291 (blue) both products of the Interchemical Corporation. A powers satisfactory aspect of the above and other suitable and well-known thermoset adhesives is the high percentage of pigment that they can often absorb or incorporate without a serious impairment of bonding strength. Consequently, a wide spectrum of colors, color shades, and degrees of opacity are possible by simply making adjustments in pigment concentration, or substituting pigments of different colors. Other suitable adhesives, of course, applicable for use in the skin construction of the present invention are well cataloged and their proper selection and employment should be well within the powers of those skilled in the art in view of the disclosure herein.

The outer skin 28 can be initially prepared for suitcase fabrication by cutting raw skin laminate material to provide suitable blanks for application to the respective lid and container portion halves of frame 24. The blanks are then properly bent and fitted to the contours of the frame half for which they were particularly designed followed by positive securement thereto. Securing the outer skin 28 to the frame 24 in suitcase 10 is a combination of strip moldings and rivets as is best illustrated in FIG. 1. Here it is desired to employ both edge moldings 30,32 extending respectively about the peripheral mating edges of container portion 12 and lid portion 14, and corner moldings 34 disposed at each of the eight tri-intersecting corners of suitcase 10.

The edge moldings 30,32 are most advantageously of a generally U-shaped cross-sectional configuration such that the outer skin 28 and frame 24 can be clamped or held together between the opposing surfaces of the U. Preferably, the inner lining 26 is also fitted within the moldings 30,32 as a simple method for securement thereof to frame 24. Rivets 35 are then placed or punched through the U-shaped moldings 30,32 respectively, at selected locations therealong and in such a manner as to pierce and securely fasten together the inner lining 26, frame 24, and outer skin 28 held therewithin.

The corner moldings 34 can serve to conceal outer skin seams that would occur at points located thereunder when employing certain advantageous skin blank designs. For instance, a likely skin blank design for suitcase 10 would be a heavy cross-configurated structure wherein the extended portions thereof comprise that part of the skin blank to be bent around frame 24 and secured therewith at the edge moldings 30,32. Here, as can be readily seen, outer skin seams occur at the tri-intersecting corners of suitcase 10 which are advantageously concealed by corner moldings 34. Again, as with edge moldings 30,32, rivets 35 securely fasten together the corner moldings 34, outer skin 28, frame 24, and inner lining 26.

An important advance in the art made possible by the present invention is the ease of fabrication of the outer skin wherein only a minimum of existing equipment need be employed. Preferably in three-ply construction the intermediate ply 38 and outer ply 40 material first secured together. This can be accomplished in the usual manner by first coating the interface of either or both plies with the desired colored adhesive. The plies are then superimposed and subjected to a pressure or heat step or both as dictated by the type adhesive employed. The two-ply laminate structure furnished hereby can then be placed on rolls for storage or shipment to a customer, or, if desired, can be routed directed to the inner ply 26 for application thereto. This versatility of skin fabrication is largely attributable to the intermediate ply 38 which substantially prevents sticking of the rolled material otherwise a likely problem area due to the often tacky nature of the adhesive employed. An outer skin 28 including an intermediate ply 38 to enable fabrication at separate locations is particularly suited to the small manufacturer who is interested in keeping his equipment inventory at a minimum, but who desires to obtain the benefits of reduced shipping costs by supplying the bulk of the outer skin material himself, that being inner ply 36 in the preferred skin arrangement. The heat-seal between the intermediate ply 38 and inner ply 36 is then preferably effected as the inner ply 36 is being extruded. The temperature of lamination, especially in view of the thin intermediate ply 38, is largely supplied by the heat of extrusion. Precise temperature controls can be obtained by placing the laminating apparatus, as for example, a pair of nip rollers, a calculated distance from the extruder. For laminated polypropylene plies wherein the above desired adhesive secured the intermediate ply 38 and outer ply 40, a laminating temperature of about 250° F. is sufficient. Where other adhesives are employed, however, care should be taken to insure a laminating temperature below that at which the adhesive bonding the intermediate and outer plies would be permanently impaired.

To obtain a superior adhesive bond in the above outer skin fabrication, intermediate and outer plies can be employed that have previously been treated to enhance the adhesion characteristics of their interface surfaces, as, for instance, by electrostatic treatment, Corona discharge treatment being a specific example thereof. While electrostatic treatment is not required to practice the principles of the present invention, it does seem to somewhat better the adhesive bonding characteristics of plastics like polypropylene having especially slick or smooth bonding surfaces, and would often be a step up to higher quality suitcase construction.

A satisfactory outer skin for suitcases like suitcase 10, of usual dimensional size and relatively stiff frame construction is an inner ply of polypropylene of about 30 mils thickness, a polypropylene intermediate ply of about ¾ mil thickness and heat-sealed thereto, and an outer ply of biaxially orientated polypropylene of about ¾ mil thickness and secured to the intermediate ply by the above-mentioned thermoset adhesive.

In one specific embodiment the above outer skin construction and arrangement is fitted and secured to the Contoura® 21 suitcase frame of the Samsonite Corporation. Surprisingly, it was found that fitting of the outer skin to the contours of the frame could be satisfactorily accomplished by thermoforming the outer skin, even though what would generally be referred to as a thermoset adhesive secured the outer and intermediate plies thereof. A suitcase of this construction wherein the outer skin had been thermoformed to fit the frame was extensively tested and compared with production cases. In all aspects, the toughness or abrasive-resistance of the outer skin, as well as its resistance to delamination, and to blushing at the outer visible areas thereof was deemed satisfactory.

While certain representative embodiments and details have been shown for purposes of illustrating the invention, it will be apparent to those skilled in the art that various changes and modifications can be made therein without departing from the spirit and scope of the invention. Such changes can be made in other structures and materials which serve to achieve the principles of this invention.

Accordingly, what is claimed is:

1. A piece of luggage including a skin portion resistant to stress-whitening and visible at the exterior of said luggage, said skin portion comprising a laminate, the outer most layer of which is sufficiently thin so as to be substantially resistant to stress-whitening, said outermost layer being secured to a plastic layer disposed adjacent thereto by a glue layer comprising a generally opaque adhesive, at least one layer of said skin portion other than said outermost layer comprising an olefin polymer layer of at least 10 mils in thickness and relatively susceptible to stress-whitening said olefin layer being concealed behind at least said outermost layer and said glue layer.

2. The luggage of claim 1 wherein the color of said glue layer is visible through said outermost layer.

3. The luggage of claim 1 wherein said olefin layer comprises said plastic layer.

4. The luggage of claim 1 wherein said outermost layer is less than about 1¼ mils in thickness.

5. The luggage of claim 4 wherein said outermost layer comprises a propylene polymer.

6. The luggage of claim 4 wherein said olefin layer has a thickness within a range of about 10 mils to about 60 mils.

7. The luggage of claim 6 wherein said olefin layer comprises a propylene polymer.

8. The luggage of claim 6 wherein said plastic layer comprises an intermediate layer, said intermediate layer being secured to said olefin layer.

9. The luggage of claim 8 wherein said intermediate layer comprises a propylene polymer.

10. The luggage of claim 8 wherein said outermost layer comprises a propylene polymer, said outermost layer having a thickness of less than about 1¼ mils.

11. The luggage of claim 8 wherein said layers are substantially nonpigmented.

12. The luggage of claim 8 wherein said outermost layer translucent or transparent.

UNITED STATES PATENT OFFICE
CERTIFICATE OF CORRECTION

Patent No. 3,608,682     Dated   28 September 1971

Inventor(s)   John R. Newton, Carl B. Salzinger

It is certified that error appears in the above-identified patent and that said Letters Patent are hereby corrected as shown below:

In column 2, line 73, delete "thereto" and insert -- outer --.

In column 3, line 71, delete "impacts" and insert -- broad --.

In column 4, line 22, delete "2" and insert -- outer --; in line 41, delete "powers" and insert -- most --.

In column 5, line 18, delete "material" and insert -- are --; in line 25 delete "directed" and insert -- directly --.

Signed and sealed this 2nd day of May 1972.

(SEAL)
Attest:

EDWARD M. FLETCHER, JR.
Attesting Officer

ROBERT GOTTSCHALK
Commissioner of Patents